… 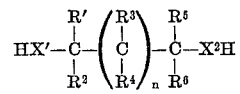

3,682,819
LUBRICATING AND FUEL OIL COMPOSITIONS
Arthur Leslie Morris, Didcot, and Peter J. Morris and Dennis J. Simpkin, Wantage, Berkshire, England, assignors to Esso Research and Engineering Company
No Drawing. Filed Jan. 30, 1970, Ser. No. 7,248
Claims priority, application Great Britain, Feb. 6, 1969, 6,437/69
Int. Cl. C10m 1/48, 1/54
U.S. Cl. 252—32.7 E      2 Claims

ABSTRACT OF THE DISCLOSURE

Lubricating oil or fuel oil compositions containing as antiwear additives an amine salt of a compound of one of the following formulae:

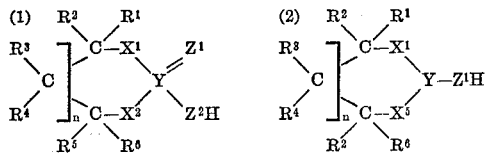

where $X^1$ and $X^2$ similar or dissimilar are oxygen or sulphur; Y is phosphorus or arsenic; $Z^1$ and $Z^2$ similar or dissimilar are oxygen or sulphur; $R^1$, $R^2$, $R^3$, $R^4$, $R^5$ and $R^6$ are hydrogen or hydrogen- and carbon-containing groups; provided at least one of $R^1$, $R^2$, $R^5$ and $R^6$ is a hydrogen- and carbon-containing group; and $n$ is zero or an integer from one to six inclusive.

---

This invention relates to lubricating oil or fuel oil compositions which contain additives which confer antiwear properties on the oil.

According to this invention lubricating oil or fuel oil compositions comprise a major proportion by weight of a lubricating oil or of a fuel oil, and a minor proportion by weight of an amine salt of a compound of one of the following formulae

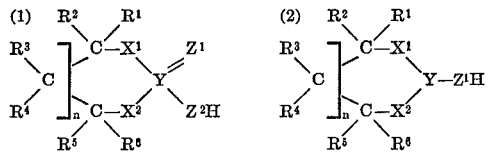

where $X'$ and $X^2$ similar or dissimilar are oxygen or sulphur;

Y is phosphorus or arsenic;

$Z'$ and $Z^2$ similar or dissimilar are oxygen or sulphur;

$R'$, $R^2$, $R^3$, $R^4$, $R^5$ and $R^6$ are hydrogen or hydrogen- and carbon-containing groups; provided at least one $R'$, $R^2$, $R^5$ and $R^6$ is a hydrogen- and carbon-containing group; and $n$ is zero or an integer from one to six inclusive.

Formula 1 represents cyclic orthophosphoric acids when Y is phosphorus and $X'$, $X^2$, $Z'$ and $Z^2$ are oxygen, and represent cyclic thio phosphoric acids when one or more of $X'$, $X^2$, $Z'$ and $Z^2$ are sulphur, the remainder being oxygen. Formula 2 represents cyclic phosphorous acids when Y is phosphorus and $X'$, $X^2$, $Z'$ and $Z^2$ are oxygen, and represent cyclic thio phosphorous acids when one or more of $X'$, $X^2$, $Z'$ and $Z^2$ are sulphur, the remainder being oxygen. When Y is arsenic the corresponding cyclic arsenic, thio arsenic, arsenious and thioarsenious acids are formed.

The compounds shown in the Formulae 1 and 2 are readily prepared from diols or thiols wherein the carbon atoms bearing —OH and/or —SH groups are continuous or separated by $n$ carbon atoms. The diols and thiols have the general formulae $$HX'-\underset{R^2}{\underset{|}{C}}-\left(\underset{R^4}{\underset{|}{\overset{R^3}{\overset{|}{C}}}}\right)_n-\underset{R^6}{\underset{|}{\overset{R^5}{\overset{|}{C}}}}-X^2H$$

where $X'$ and $X^2$ similar or dissimilar are oxygen or sulphur, $R'$, $R^2$, $R^3$, $R^4$, $R^5$ and $R^6$ are hydrogen or hydrogen- and carbon-containing groups: provided at least one of $R'$, $R^2$, $R^5$ and $R^6$ is a hydrogen- and carbon-containing group, and $n$ is 0 or an integer of from one to six.

Preferably both $X'$ and $X^2$ are the same, and in particular both are oxygen atoms. The hydrogen- and carbon-containing groups $R'$ to $R^6$ inclusive preferably only contain carbon and hydrogen atoms in which case they are termed hydrocarbyl groups, e.g. alkyl, alkaryl, aryl, aralkyl, alicyclic or alkenyl groups. However, these hydrogen- and carbon-containing groups may also be substituted by polar substituents, e.g. chloro, bromo, keto, ethereal, aldehydo or nitro atoms or groups. Preferably, these polar substituents are not present in proportions sufficiently large to alter significantly the hydrocarbon character of the group; e.g. they contain no more than 10% by weight of polar substituent based on the hydrocarbyl portion of the group. For the sake of brevity these hydrogen- and carbon-containing groups are hereinafter called hydrocarbyl groups, even if they also contain polar substituents.

The hydrocarbyl groups $R'$ to $R^6$ are preferably relatively short chain, e.g. contain 1 to 6 carbon atoms as in methyl, ethyl, propyl, etc. These groups are preferably alkyl groups.

Although only one of the groups $R'$, $R^2$, $R^5$ and $R^6$ need be a hydrocarbyl group it is preferable if at least two of them are hydrocarbyl groups. Particularly suitable diols have been found to be 2 methyl pentane 2,4-diol; butane-2,3-diol; 2-ethyl hexane-1,3-diol; and pinacol (2,3 dimethyl 2,3 butane diol).

The analogous dithiols or monothiols are equally suitable starting materials for the preparation of the compounds shown in Formulae 1 and 2.

To obtain the compounds shown in the Formula 1 the diols or thiols are reacted with phosphorus or arsenic pentasulphide or with the corresponding compounds wherein sulphur atoms are replaced by oxygen atoms, e.g. phosphorus or arsenic pentoxide. To obtain the compounds shown in the Formula 2 the diols or thiols are reacted with phosphorus or arsenic trisulphide, or with the corresponding compounds wherein sulphur atoms are replaced by oxygen atoms. Preferred reactants are phosphorus pentasulphide or phosphorus pentoxide, whence compounds of Formula 1 are formed. Whether compounds of Formula 1 or 2 are desired approximately two moles of diol per mole of the phosphorus sulphide or oxide should be used.

The amine from which the amine salt is derived can be a primary, secondary or tertiary amine or a polyamine having more than one amino group. It may also be an alkyl, aryl, alkaryl, or aralkyl amine. Thus, the amine can be a primary alkyl amine, especially a $C_8$ to $C_{24}$ primary alkyl amine such as nonylamine, a laurylamine, a tetradecylamine, an octadecylamine, an eicosanylamine, or branched chain primary amine analogues, such as Primene 81–R (a t-alkyl primary amine $C_{12}$–$C_{14}$). It may alternatively be a secondary amine having two alkyl groups attached to the nitrogen atom in which the alkyl groups may have for example chain lengths of 6 to 12 carbon atoms, for example a dihexyl amine or a dioctyl amine. As another alternative especially when the lubricating oil is an ester, the amine could be a tertiary amine, especially a long chain amine, e.g. having hydrocarbyl groups with 5 to 15 carbon atoms, e.g. a tridecyl amine. The preferred monoamines however are primary amines.

Suitable polyamines include diamines, e.g. a hexylene diamine, an octylene diamine, a decylene diamine, or the mono- or di-N alkyl substituted derivatives of short chain diamines, such as $C_2$ to $C_6$ alkylene diamines. N-hydrocarbyl or N,N' di-hydrocarbyl substituted ethylene or propylene diamines where the hydrocarbyl groups have at least 3 carbon atoms, e.g. 3-lauryl-amino-1-butyl amine or N,N' di-dodecyl-1,3-propylene diamine are suitable examples.

The preferred amine salts are those of primary amines.

The amine salts used in lubricating oil or fuel oil of the invention can be conveniently prepared by reacting together the diol or thiol, the phosphorus sulphide or oxide and amine in proportions of approximately 2 mole:1 mole:2 mole respectively. The reaction conveniently takes place in the presence of a diluent oil, e.g. mineral oil, and in an inert atmosphere. The amine and diol or thiol are preferably added to the other reactant whence an exothermic reaction takes place. After the addition of the reactants the mixture is preferably heated to complete the reaction. However the reaction may be carried out as a one-step reaction whence all three reactants are reacted together.

The amine salt is added to a lubricating oil or a fuel oil. Suitable lubricating oils include animal, vegetable or mineral oils, for example petroleum oil fractions ranging from spindle oil to SAE 30, 40 or 50 lubricating oil grades; castor oil, fish oils, oxidised mineral oil or brightstocks. Synthetic esters may also be used, e.g. diesters such as those prepared by esterifying carboxylic acids such as adipic or sebacic acid with monohydric alcohols; or complex esters obtained by the esterification of a polyhydric alcohol (e.g. a polyglycol) with a dibasic acid (e.g. sebacic or adipic acid) and a monohydric alcohol (e.g. 2-ethyl hexanol or a $C_8$ oxo alcohol).

Alternatively the amine salt may be added to a fuel, especially a liquid hydrocarbon fuel oil. Thus, the fuel may be a petroleum distillate fuel boiling above 200° C. and including light fuel oils, gas oils used as fuels for diesel engines, heavy oils used in furnaces, kerosene, diesel fuels, and residual fuels.

The amine salts are added in minor proportions to a lubricating oil or fuel. The preferred amount for lubricating oils is between 0.01 and 10% by weight e.g. between 0.1 and 5% by weight, based on the total weight of the composition, whilst the preferred proportion for fuels is between 0.001 and 5% by weight, e.g. between 0.005% and 0.5% by weight, based on the total weight of the compositions.

Other additives, for example detergents (e.g. calcium sulphonates) or V.I. improvers (e.g. vinyl acetate/fumarate copolymers) may be added to the oil or fuel.

EXAMPLE 1

Hexylene glycol is reacted with phosphorus pentasulphide and a primary amine according to the following reaction

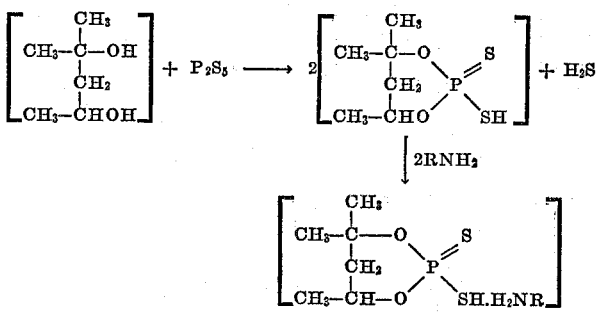

The quantities of reactants were as follows:

| | Wt. percent | Mole proportion |
|---|---|---|
| Hexylene glycol | 21.0 | 1.0 |
| Phosphorus pentasulphide | 19.7 | 0.5 |
| Primene 81-R (a t-alkyl primary amine $C_{12}$-$C_{14}$) | 35.0 | 1.0 |
| KB 25 (a diluent oil) | 24.3 | |

The phosphorus pentasulphide and KB 25 were charged into the reactor under nitrogen. The hexylene glycol and Primene 81-R were mixed and added slowly at ambient temperature whence an exothermic reaction took place. After this addition the reaction mixture was heated to 140° C. and maintained at this temperature for 30 minutes with nitrogen sparging. The resultant product required no filtration. This product was added at 1% by weight concentration to the lubricating oil KB 25.

EXAMPLE 2

The procedure of Example 1 was repeated using in each case equivalent proportions of pinacol and 2-ethyl hexane, 1,3-diol respectively instead of hexylene glycol.

The products were also added at 1% wt. concentration to the lubricating oil KB 25 used in Example 1.

The lubricating oil compositions obtained in Examples 1 and 2 were tested for anti-wear properties using the 4-ball test. Also for comparison the lubricating oil alone, and with 1.0 wt. percent of zinc, dialkyl, dithiophosphate were tested using the 4-ball test.

The results obtained were as follows:

| Additive (1.0 wt. percent) | Wear scar diameter | | | Weld load (kg.) |
|---|---|---|---|---|
| | 30 kg. | 40 kg. | 60 kg. | |
| None | 1.00 | 1.8 | 2.15 | 120 |
| ZDDP | 0.35 | 0.50 | 1.60 | 152 |
| Hexylene glycol/$P_2S_5$/81R | 0.30 | 0.35 | 1.20 | 185 |
| Pinacol/$P_2S_5$/81R | 0.30 | 0.43 | 0.80 | 220 |
| 2-ethyl hexane diol/$P_2S_5$/81R | 0.39 | 0.50 | 0.75 | 180 |

What is claimed is:

1. An oil composition comprising a major weight proportion of an oil selected from the group consisting of a lubricating oil and a fuel oil, and a minor weight proportion of a compound prepared by reacting together
   (a) a primary alkyl amine of from about 8 to 24 carbon atoms,
   (b) a phosphorus sulfide, and
   (c) a diol or thiol of the formula

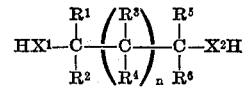

wherein $X^1$ and $X^2$ are selected from the group consisting of oxygen and sulfur, $R^1$, $R^2$, $R^3$, $R^4$, $R^5$, and $R^6$ are selected from the group consisting of hydrogen and alkyl of from 1 to 6 carbon atoms, at least one of $R^1$, $R^2$, $R^5$ and $R^6$ being alkyl, and $n$ is zero or an integer, from 1 to 6.

2. Composition according to claim 1 wherein about 2 moles of (a) are reacted with about 1 mole of (b) and about 2 moles of (c).

References Cited

UNITED STATES PATENTS

| | | | |
|---|---|---|---|
| 3,089,850 | 5/1963 | McConnell et al. | 252—32.7 E |
| 3,135,694 | 6/1964 | Loughran et al. | 252—32.7 E |
| 3,159,664 | 12/1964 | Barlett | 252—32.5 E |
| 2,285,855 | 6/1942 | Downing et al. | 252—49.9 X |

DANIEL E. WYMAN, Primary Examiner

W. H. CANNON, Assistant Examiner

U. S. Cl. X.R.

252—32.5, 33.6; 44—DIGEST 4, 72